United States Patent [19]

Nutz

[11] 4,132,909

[45] Jan. 2, 1979

[54] ZERO AXIS CROSSING DETECTOR

[75] Inventor: Karl-Diether Nutz, Heilbronn, Germany

[73] Assignee: Licentia Patent-Verwaltungs-G.m.b.H, Frankfurt, Germany

[21] Appl. No.: 743,142

[22] Filed: Nov. 18, 1976

[30] Foreign Application Priority Data

Nov. 29, 1975 [DE] Fed. Rep. of Germany ....... 2553764

[51] Int. Cl.$^2$ ........................................... H03K 5/153
[52] U.S. Cl. .................................... 307/354; 328/150
[58] Field of Search ....................... 307/354, 252 UA; 328/150; 323/18

[56] References Cited

PUBLICATIONS

IBM Technical Disclosure Bulletin, vol. 12, No. 8, Jan. 1970, p. 1177, "Zero-crossing Detector and Pulse Generator," by L. M. Koch.

*Primary Examiner*—John Zazworsky
*Attorney, Agent, or Firm*—Spencer & Kaye

[57] ABSTRACT

A zero axis crossing detector for integrated bipolar circuits comprising two current paths connected in parallel to the input for the alternating current signal, for receiving direct current alternately in each path in dependence on the positive and negative half cycles of the alternating current signal and blocking both current paths during zero phases of the alternating current signal, a contant current source providing a direct current output across the paths during positive and negative half cycles and a transistor in each current path connected in a current mirror circuit and connected to provide the same current values of the current supplied by the constant current source in both current paths.

7 Claims, 2 Drawing Figures

ZERO AXIS CROSSING DETECTOR

BACKGROUND OF THE INVENTION

The invention relates to a zero axis crossing detector for bipolar circuits made up of two current paths provided with transistors and connected in parallel so that a d.c. current flows in one half-wave of the alternating current signal via one current path and a direct current flows in the other half-wave via the other current path, and both current paths are blocked only during the zero axis crossing phases of the alternating current signal.

Zero axis crossing detectors are used for example for controlling full-wave thyristors (Triac). The triac should be controlled during the zero axis crossing of an alternating current signal in order to reduce to a minimum the disturbances caused by switching which occur in the alternating current network. Moreover, zero axis crossing detectors are also required for phase gating control circuits for synchronizing saw-tooth generators.

Until now a zero axis crossing detector was used in which a first transistor is connected by its base electrode to the signal input for the alternating current signal. The emitter-collector path of the first transistor is connected between the poles of a direct voltage source together with a collector-resistor.

Connected in parallel to the collector-emitter path of the first transistor is the emitter-collector path of a second transistor, in which the collector resistor of the first transistor forms the emitter resistor of the second transistor. The base of this second transistor is connected to the collector of a third transistor, the emitter of which is connected to the signal input. The base of the third transistor is connected to earth. The first and third transistors are pnp transistors while the second transistor is an npn transistor.

The described prior art circuit has the substantial disadvantage that the output pulses are non-symmetrical in their parts allotted to the positive and negative half-wave of the alternating current signal. This rests on the fact that the current which is required for connecting one current path is substantially smaller than the current required for connecting the other current path. Thus the first transistor is driven in emitter connection in the negative half-wave so that the total current amplification of the first transistor goes into the drive process. On the other hand, the third transistor is driven in base connection in the positive half-wave, this base connection not providing any current amplification. As a result it is compulsory that the pulse width is distributed non-symmetrically over the two half-waves of the alternating current signal.

The lack of symmetry is undesirable in many cases

SUMMARY OF THE INVENTION

It is an object of the invention to provide a zero crossing detector in which the detector pulses can be made symmetrical about the zero crossing.

According to a first aspect of the invention, there is provided a zero axis crossing detector for integrated bipolar circuits comprising first and second current paths connected in parallel to an input for an alternating current signal to provide a direct current flow in alternating ones of said first and second current paths in dependence on negative and positive half cycles of the alternating current signal respectively and to provide a blocking of both said first and second current paths in zero axis crossing phases of the alternating current signal, a constant current source connected to provide an output direct current flowing through one of said first and second current paths alternately in dependence on the positive and negative half cycles of the alternating current signal, and first and second transistors in said first and second current paths respectively and connected in current mirror circuit to provide the same current values of the current supplied by said constant current source to individual ones of said first and second current paths.

According to a second aspect of the invention, there is provided a zero axis crossing detector for integrated bipolar circuits made up of two current paths provided with transistors and connected in parallel so that a direct current flows away in the one half-wave of the alternating current signal via the one current path and a direct current flows away in the other half-wave via the other current path and both said current paths are blocked only in the zero axis crossing phases of the alternating current signal, characterized in that a constant current source is provided the direct current output of which flows alternately via one of the two current paths during the two half-waves and that a first and second transistor constructed as a current mirror circuit is arranged in each current path respectively and so constructed and connected that the current supplied by the constant current source flows away via one or the other current path both in the positive and in the negative half-wave of the alternating current signal respectively always at the same current value.

BRIEF DESCRIPTION OF THE DRAWINGS

The invention will now be described in greater detail, by way of example, with reference to the drawings, in which.

DESCRIPTION OF THE PREFERRED EMBODIMENT

Figure 1:
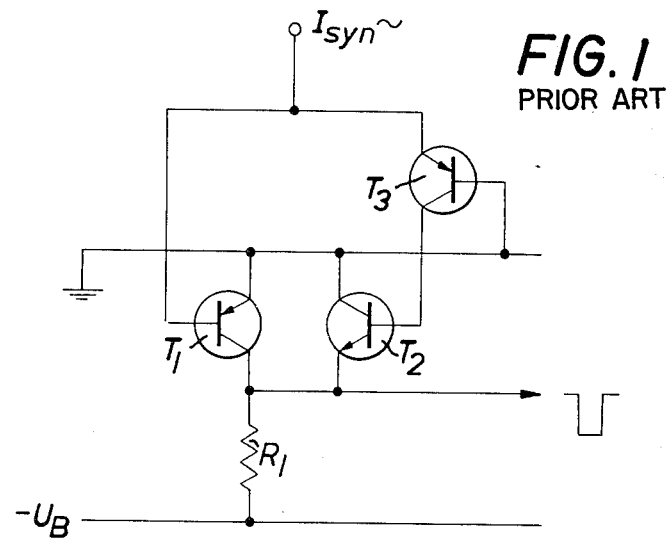
FIG. 1 is a circuit diagram of a zero crossing detector of known construction.

Up to the time of the present invention, a zero axis crossing detector was used as shown in FIG. 1. In this detector the transistor $T_1$ is connected with its base electrode to the signal input for the alternating current signal $I_{syn}\sim$. The emitter-collector path of the transistor $T_1$ is connected between the poles of a direct voltage source $U_B$ together with a collector-resistor $R_1$.

Connected in parallel to the collector-emitter path of the transistor $T_1$ is the emitter-collector path of the transistor $T_2$, in which the resistor $R_1$ forms the emitter resistor. The base of this transistor $T_2$ is connected to the collector of a transistor $T_3$, the emitter of which is connected to the signal input. The base of the transistor $T_3$ is connected to earth. The transistors $T_1$ and $T_3$ are of one polarity type, i.e. pnp transistors, while transistor $T_2$ is of the opposite polarity type, i.e., an npn transistor.

The described circuit operates as follows:

The transistor $T_1$ is driven in the negative half-wave of the alternating current signal as soon as the current supplied by the alternating current source supplies the required base current for driving the transistor $T_1$. The transistor $T_1$ then remains conductive up to the zero axis crossing of the alternating current signal so that during this time the voltage $U_B$ drops across the resistor $R_1$.

The transistor $T_3$ is fired in the positive half-wave, and takes with it in turn the transistor $T_2$ connected as an emitter follower so that even in the positive half-wave the voltage $U_B$ drops across the resistor $R_1$.

Only in the zero axis crossing phases, i.e. in the time during which the alternating current signal has not yet reached the current value required for driving the transistors, are both current paths blocked via $T_1$ to $T_2$ and $T_3$, so that the potential of the earth potential drops to $-U_B$ at the collector of the transistor $T_1$ and at the emitter of $T_2$.

The described circuit does however have the substantial disadvantage that the output pulses are non-symmetrical in their parts allotted to the positive and negative half-wave of the alternating current signal. This rests on the fact that the current which is required for connecting one current path is substantially smaller than the current required for connecting the other current path. Thus the transistor $T_1$ is driven in emitter connection in the negative half-wave so that the total current amplification of the transistor $T_1$ goes into the drive process. On the other hand the transistor $T_3$ is driven in base connection in the positive half-wave, said base connection not emitting any current amplification. As a result it is compulsory that the pulse width is distributed non-symmetrically over the two half-waves of the alternating current signal.

The lack of symmetry is undesirable in many cases and should therefore be overcome.

In a preferred embodiment of the invention, this is overcome by providing a constant current source the direct current output $I_K$ of which is removed on alternate sides during the two half-waves via one of the two current paths. A transistor $T_1$ or $T_3$, of a current mirror circuit is arranged in each current path and arc so constructed and connected so that the current supplied by the constant current source flows away via one or the other current path both in the positive and in the negative half-wave of the alternating current signal always at the same current value.

Since, with the above circuit, the current supplied by the constant current source flows away both in the positive and in the negative half-wave of the alternating current signal always at the same current value via one or the other current path, it is established that the pulse width of the output pulses is distributed evenly over the positive and negative half-wave of the alternating current signal.

In an advantageous refinement of the circuit in accordance with the invention the two transistors $T_1$ and $T_3$, which are constructed as a current mirror circuit, are so constructed and connected into the current paths that each of the transistors fires in the half-wave of the alternating current signal assigned to it at a current value which is twice as large as the current supplied by the constant current source.

The transistors constructed as a mirror image circuit are preferably transistors having several collectors and one common emitter connection. In these transistors the same current must flow across all collectors for reasons of symmetry.

Figure 2:
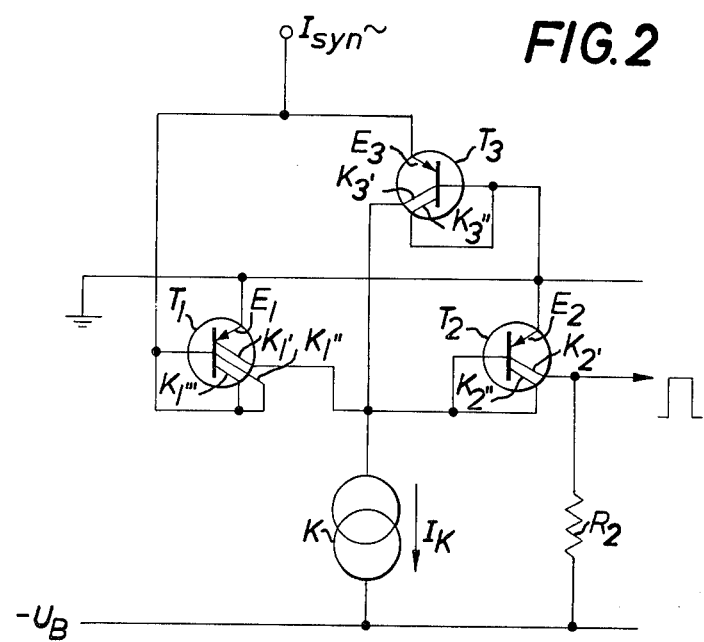
FIG. 2 is a circuit diagram of a zero crossing detector in accordance with the invention.

FIG. 2 shows an embodiment of the invention.

The circuit contains a constant current source K the construction of which is not shown in detail as these circuits are sufficiently well-known. The constant current source supplies a current $I_K$ which may drain away across three different current paths. The one current path leads across the transistor $T_1$. This transistor $T_1$ has three collectors of which one $K_1'$ is connected to the constant current source. The two other collectors $K_1''$, $K_1'''$ are short-circuited to the base of the transistor $T_1$ and are connected to the signal input for the alternating current. The emitter of the transistor $T_1$ is connected to earth, as it is a pnp transistor. The constant current source, on the other hand, is connected to the $-U_B$ pole of the direct voltage source. The second current path leads across the transistor $T_3$. The latter has two collectors of which one $K_3'$ is connected to the constant current source. The second collector $K_3''$ is short-circuited to the base of transistor $T_3$ and connected to earth, while the emitter $E_3$ is connected to the signal input.

The third current path which is provided for coupling out the signal in the zero axis crossing phases leads across the transistor $T_2$. This transistor $T_2$ has two collectors of which one $K_2''$ is short-circuited with the base of transistor $T_2$ and connected to the constant current source. The other collector $K_2'$ is connected via a collector resistor $R_2$ to the negative pole $-U_B$ of the direct voltage source. The emitter $E_2$ is in turn connected to earth.

In all transistors it is a question of pnp transistors i.e., all transistors have the same region sequence. The principles of switching may however also be carried out analogously with npn transistors.

The circuit operates as follows:

The current $I_K$ is discharged in the negative half-wave of the alternating current signal $I_{syn}\sim$ via the collector $K_1'$ of the transistor $T_1$. It is assumed that the current $I_K = 10$ $\mu$A, then for reasons of symmetry a current of 10 $\mu$A must flow across all three collectors when the transistor $T_1$ is driven. The transistor $T_1$ therefore conducts if $I_{syn}\sim$ has reached the value 20 $\mu$A (including the first negligible value for $I_B$).

In the positive half-wave similarly a current of 20 $\mu$A must flow across $E_3$ of the transistor $T_3$ so that 10 $\mu$A may flow across the collectors $K_3'$ and $K_3''$ respectively. Thus in the positive half-wave, the current path for the current $I_K$ passing across $K_3'$ is conducting if $I_{syn}\sim$ has reached the value 20 $\mu$A.

At current values which are greater in amount than 20 $\mu$A then one of the two current paths is always conducting across $T_1$ or $T_3$ while the transistor $T_2$ remains blocked. Only in the zero axis crossing phases, in which the current value of the alternating current signal lies below 20 $\mu$A in amount, does the current $I_K$ drive the transistor $T_2$. Then a current of 10 $\mu$A flows across $K_2''$ and thus, for reasons of symmetry, also across $K_2'$ and the potential at the collector of $K_2'$ is raised to the value $R_2 \cdot 10$ $\mu$A. It should be pointed out that the stated current values of 10 or 20 $\mu$A have only been used as an example and the mode of operation of the circuit is the same for any current supplied by the constant current source.

It should however be mentioned that the small base current of the transistor which is negligible per se is greater at transistor $T_1$ than at transistor $T_3$. This is because the total collector current amounts to $3 \times I_K$ at transistor $T_1$ and amouns to only $2 \times I_K$ at transistor $T_3$. If it is desired to compensate even for the resulting and extremely small non-symmetry then this may be carried out by means of appropriate geometric distribution of the partial collectors of $T_1$. With a current amplification of B = 30 an absolute symmetry is achieved if the total surface of the two collectors $K_1''$ and $K_1'''$ amounts to 1.96 times the surface of the collector $K_1'$. Even the collectors of $T_2$ and $T_3$ are equal in area to $K_1''$. This area is produced from the equation $$\frac{F_{K_1''} + F_{K_1'''}}{F_{K_1'}} = \frac{2B + 1}{B + 1}$$

wherein $F_K$ constitutes the area of the respective collector when constructed as a multi-collector pnp transistor.

It will be understood that the above description of the present invention is susceptible to various modification changes and adaptations.

What is claimed is:

1. In a zero axis cross detector for integrated bipolar circuits including an input terminal for an alternating current signal source, two current paths provided with a first and a second transistor respectively and connected in parallel, said two current paths being connected directly to said input terminal with said first transistor having its base connected to said input terminal so that the alternating current signal at said input terminal furnishes the turn on current for said first transistor and consequently for the associated one of said two current paths and with said second transistor having its emitter connected to said input terminal, circuit means interconnecting said transistors to cause a current to flow in one of said current paths during one half-wave of the alternating current signal, a current to flow in the other of said two current paths during the other half-wave of the alternating current signal, and both of said current paths to be blocked only during zero axis crossing of the alternating current signal, and means for providing an output signal during the zero axis crossing of the alternating current signal at said input terminal; the improvement wherein: said circuit means includes a constant current source connected to said first and second transistors so that its direct current output flows alternately via one of said two current paths during the two half-waves of the alternating current signal; both said first and second transistors are constructed as current mirror circuits which are responsive to the positive and negative half-waves of the alternating current signal at said input terminal to switch the current supplied by said constant current source to one or the other of said current paths always at the same alternating current value which is dependent on the constant current of said constant current source; and said means for providing an output signal includes a third transistor and means for connecting said third transistor to said constant current source to cause the current furnished by said constant current source to flow through said third transistor during the zero axis crossing of the alternating current signal to provide said output signal.

2. A zero axis crossing detector as defined in claim 1, wherein said transistors all comprise transistors with the same semiconductor region sequence.

3. A zero axis crossing detector as defined in claim 1, wherein said first and second transistors are each constructed and connected to be switched on in the assigned half-wave of the alternating current signal at a current value which is twice as large as the current supplied by said constant current source.

4. A zero axis crossing detector as defined in claim 1, wherein said first transistor has three collectors and is connected in one current path, one of said collectors is short-circuited to said constant current source and the other two collectors are short-circuited to the base of said first transistor and are connected to said signal input terminal, and the emitter of said first transistor is connected to one pole of a direct voltage source; and wherein said second transistor is connected in the other current path and has two collectors, of which one is short circuited to said constant current source and the other collector is short-circuited to the base of said second transistor and is connected to said one pole of said direct voltage source, and the emitter of said second transistor to said signal input terminal.

5. A zero axis crossing detector as defined in claim 1, wherein said third transistor has two collectors of which one is short-circuited to the base of said third transistor and is connected to said constant current source, while the second collector is connected to one pole of a d.c. voltage source via an output resistor, and has an emitter connected to the opposite pole of the d.c. voltage source.

6. A zero axis crossing detector as defined in claim 4 wherein said third transistor has two collectors of which one is short-circuited to the base of said third transistor and is connected to said constant current source, while the second collector is connected to the opposite pole of said d.c. voltage source via an output resistor, and has an emitter connected to said one pole of the d.c. voltage source.

7. A zero axis crossing detector as defined in claim 6 wherein said transistors are all of the same polarity type and wherein said constant current source is connected between the associated ones of said associated collectors of said associated transistors and said opposite pole of said d.c. voltage source.

* * * * *